(No Model.) 3 Sheets—Sheet 3.
J. R. M. DAY & L. MOORE.
GRAIN DRILL.
No. 487,258. Patented Dec. 6, 1892.
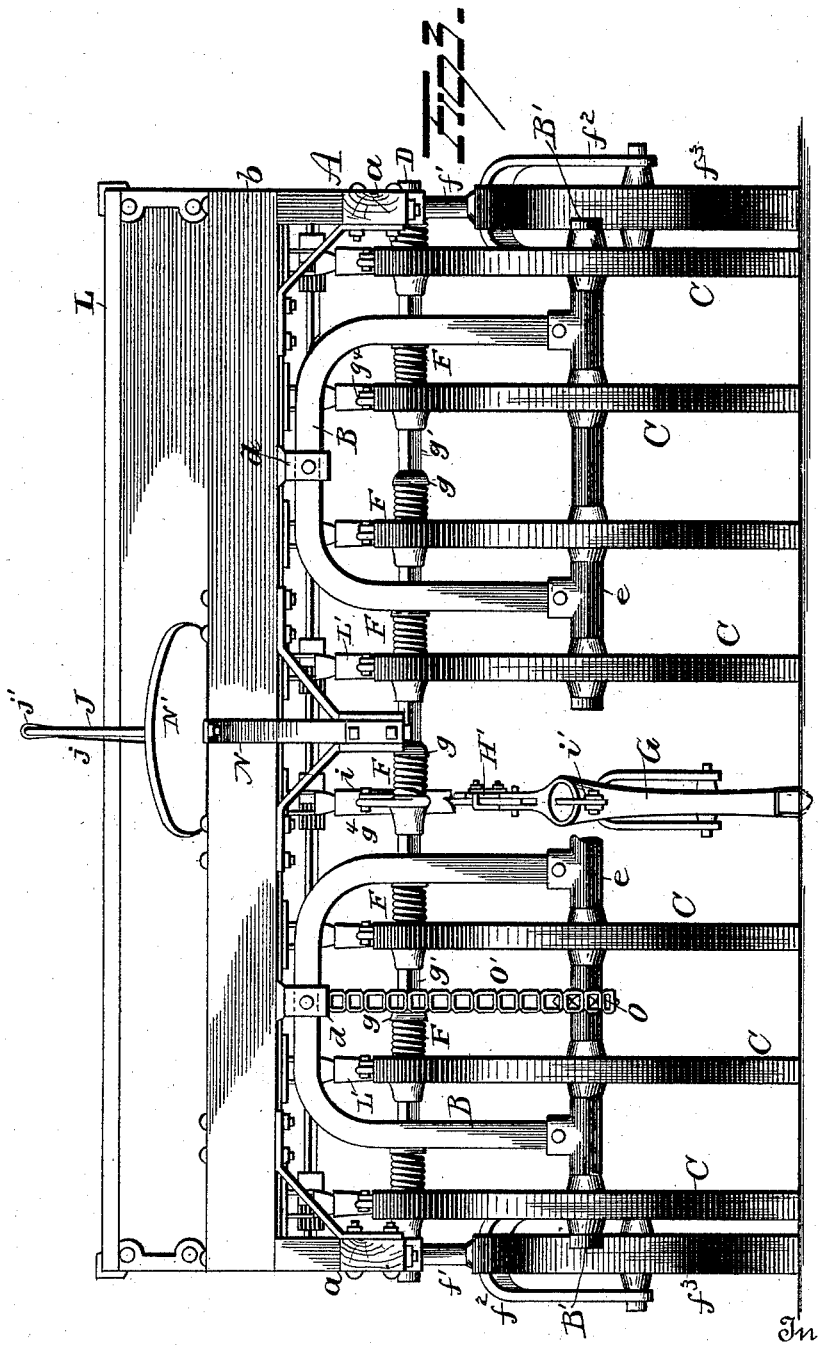
Witnesses
T. Nottingham
G. F. Downing.
Inventors
J. R. M. Day
and
L. Moore
By H. A. Seymour
Attorney

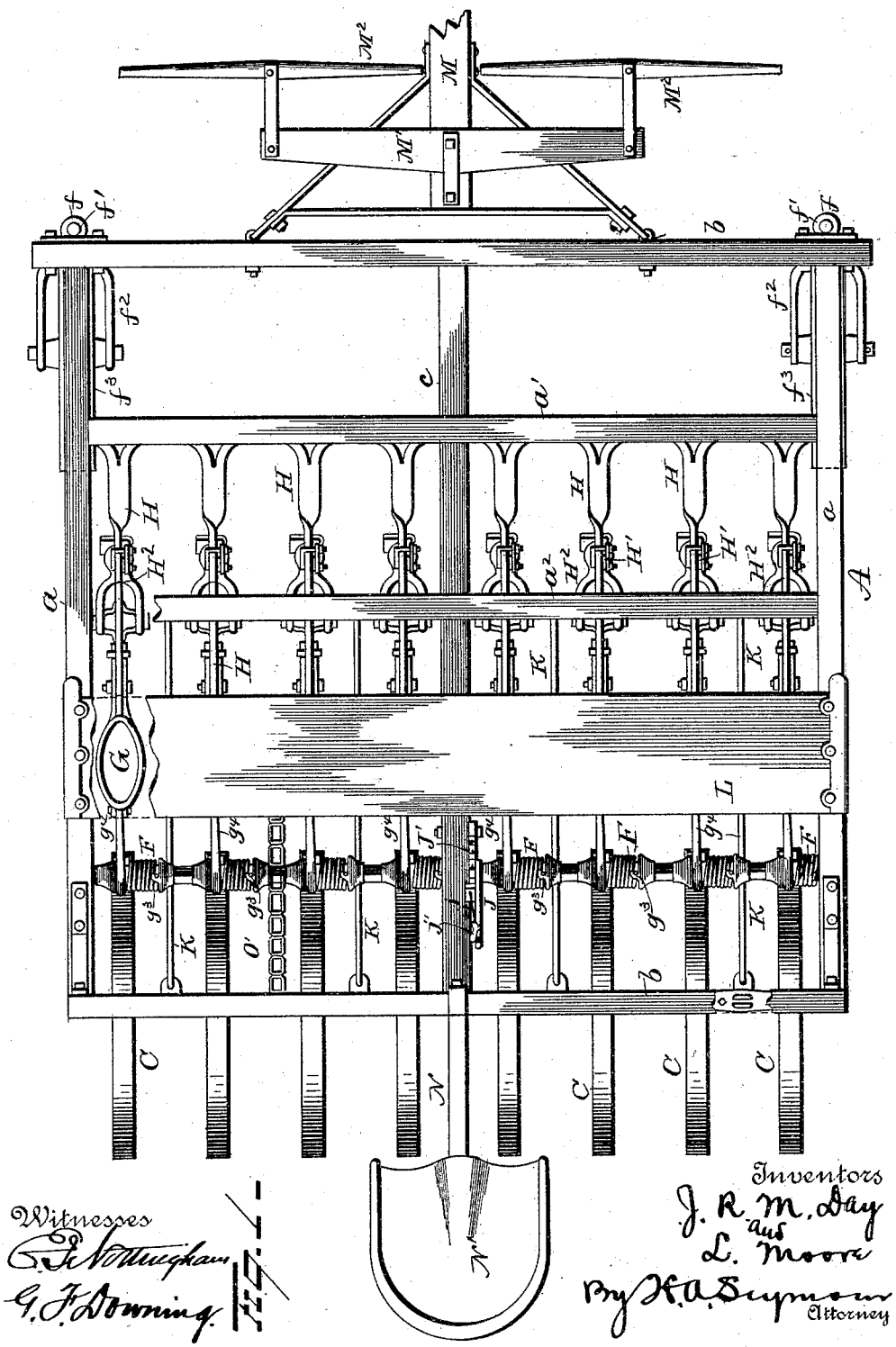

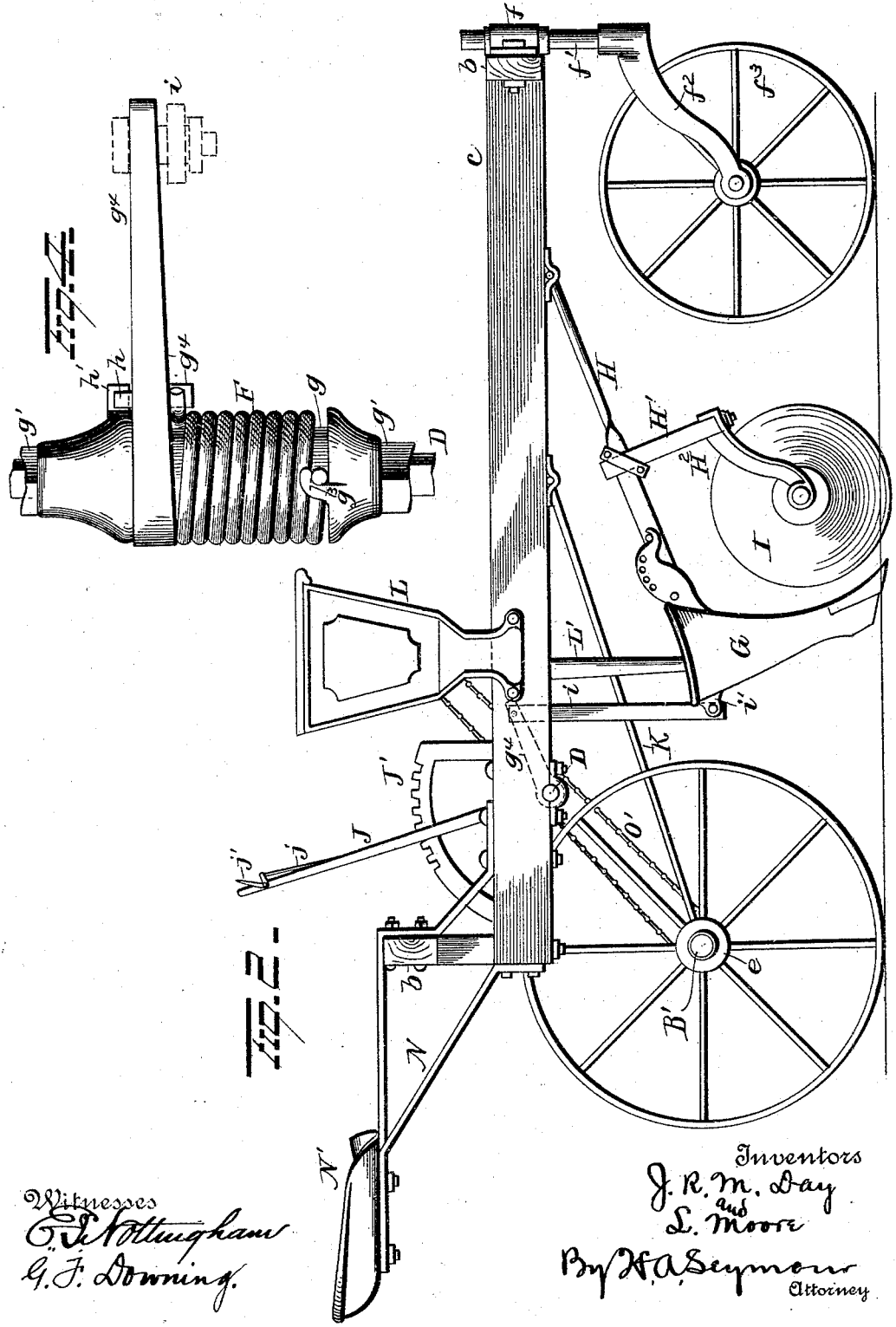

UNITED STATES PATENT OFFICE.

JAMES R. M. DAY AND LUZERN MOORE, OF WINFIELD, KANSAS, ASSIGNORS OF ONE-THIRD TO J. LAWRENCE AND S. COMPTON, OF SAME PLACE.

GRAIN-DRILL.

SPECIFICATION forming part of Letters Patent No. 487,258, dated December 6, 1892.

Application filed April 28, 1892. Serial No. 431,014. (No model.)

*To all whom it may concern:*

Be it known that we, JAMES R. M. DAY and LUZERN MOORE, citizens of the United States, residing at Winfield, in the county of Cowley and State of Kansas, have invented certain new and useful Improvements in Grain-Drills; and we do hereby declare the following to be a full, clear, and exact description of the invention, such as will enable others skilled in the art to which it appertains to make and use the same.

Our invention relates to an improvement in grain-drills; and it consists in certain novel features of construction and combinations and arrangements of parts, as hereinafter set forth, and pointed out in the claims.

In the accompanying drawings, Figure 1 is a plan view of the machine, showing a portion of the seed-box broken away. Fig. 2 is a side elevation, partly in section. Fig. 3 is an end view. Fig. 4 is a detail view.

A represents a frame made of iron, wood, or other suitable material and comprising side bars or timbers $a\,a$, end bars or timbers $b\,b$, and a central bar or timber $c$, located centrally between the side bars or timbers $a\,a$ and timbers or cross-bars $a'\,a^2$.

Pivotally connected to brackets $d$, secured to the rear bar $b$ of the frame, are yokes B, (two or more,) to the free ends of which sleeves $e$ are secured, said sleeves being adapted to receive and support axles B'. On the axles B' press-wheels C are mounted, one press-wheel for each hoe and colter, hereinafter described.

At each end of the forward bar $b$ of the frame brackets $f$ are secured and serve to support rotary standards $f'$, to the lower ends of which rearwardly-extending brackets $f^2$ are secured, which brackets carry at their lower ends crazy or caster wheels $f^3$. By thus supporting the frame of the machine and the parts carried thereby on the press-wheels C and the crazy or caster wheels $f^3$ there will be no weight brought to bear on the necks of the horses. It will also be seen that the weight of the major portion of the machine will be brought to bear on the press-wheels and that no weight will be brought to bear on the hoes and colters.

Mounted at its ends on the side bars $a\,a$ of the frame, near the rear end thereof, is a shaft D, made square or angular in cross-section. On this shaft is located a series of drums $g$ and attached sleeves $g'$, which latter are made square or angular in cross-section and adapted to fit upon the shaft D. On each drum $g$ a spring F is coiled, one end of said spring being adapted to engage a tooth $g^3$, projecting from the collar at the end of the drum, and the other end being adapted to bear against a lug on an arm $g^4$. The arms $g^4$ are mounted loosely on the drums $g$ and each is provided with a lug $h$, adapted to strike a lug or projection $h'$ on the adjacent sleeve $g'$ or a collar thereon, and thus limit the movement of said arms in one direction. The arms $g^4$ project forwardly and each has pivotally connected thereto a depending bar $i$, which latter is pivotally connected at its lower end to an ear $i'$, projecting from a hoe G. A drawbar H is pivotally connected at one end to the upper end of each hoe G, and at their forward ends said draw-bars are pivotally attached to a cross-bar $a'$.

Attached to each bar H at a point between its ends is a depending arm or bar H', to the lower end of which a bracket H² is secured. Each bracket H² carries at its lower end a colter I, which is so mounted as to run directly in front of the hoe and so that its periphery will project slightly below said hoe. By this construction and arrangement of parts it will be seen that the colters will cut the soil immediately in front of the hoes and that any trash that may be on the surface or partially embedded in the surface of the ground will be cut and thus prevented from clogging the machine or injuring the hoe or its attachments. A lever J is secured to one of the sleeves $g'$ and projects upwardly, being provided with a latch-bar $j$ and a finger-bar $j'$, the latch-bar being adapted to engage a tooth rack or segment J', secured to the frame. By manipulating the lever J the hoes and the colters can be raised or lowered, as desired, and made to bear with more or less pressure on the ground. By the employment of a spring for each hoe and colter and attaching them to the hoes, as above explained, said hoes and colters will be permitted to yield should a stone or other hard obstruction be encountered.

In order to properly support the press-wheels, draw-bars K are attached at one end to the axles of the press-wheels and at the other ends to the frame of the machine.

A seed-box L is secured on the frame A directly over the hoes G, and beneath the feed-box suitable feed mechanism is provided and connected by tubes L' with the hoes in the usual manner. A tongue M will be attached to the frame in a suitable manner and provided with doubletree M' and singletrees M².

A bracket N is located at the rear end of the frame A and has secured to it a seat N' within easy reach of the operating-lever J.

The machine is very light, so constructed that there will be no weight on the horses nor on the hoes and colters, is simple in construction and effectual in the performance of its functions, and not liable to become clogged or otherwise injured by trash.

A sprocket-wheel O is carried by one of the axles for the accommodation of a chain O', whereby motion will be imparted to the feed mechanism.

If desired, the press-wheels may be dispensed with and two carrying-wheels provided in their stead; but we prefer to employ the press-wheels.

Having fully described our invention, what we claim as new, and desire to secure by Letters Patent, is—

1. In a grain-drill, the combination, with a shaft and a series of springs carried thereby, of a hoe connected with each spring, a draw-bar connecting each hoe with the frame of the machine, said hoes being pivotally connected with the draw-bars, and a colter carried by each draw-bar, substantially as set forth.

2. In a grain-drill, the combination, with a shaft and a series of springs carried thereby, of a hoe connected with each spring, a draw-bar connecting each hoe with the frame of the machine, said hoes being pivotally connected with the draw-bars, and a colter carried by each draw-bar, said colters being so mounted as to project below the lower end of the hoes, substantially as and for the purpose set forth.

3. In a grain-drill, the combination, with a frame and a shaft carried thereby, of springs carried by said shaft, arms adapted to be actuated by said springs, arms or bars depending from said first-mentioned arms, hoes pivotally connected with said depending arms or bars, draw-bars pivotally connected at one end to said hoes and at their other ends to the frame of the machine, and colters carried by said draw-bars, substantially as set forth.

4. In a grain-drill, the combination, with a frame, of depending yokes pivotally connected thereto in order to tilt transversely of the machine, axles carried by said yokes, press-wheels carried by said axles, hoes in advance of said press-wheels, draw-bars connecting said axles with the frame, and caster-wheels located at the front end of the machine, substantially as set forth.

In testimony whereof we have signed this specification in the presence of two subscribing witnesses.

J. R. M. DAY.
L. MOORE.

Witnesses:
C. I. FORSYTH,
W. R. VANPELT.